US007065918B2

(12) United States Patent
Leone

(10) Patent No.: US 7,065,918 B2
(45) Date of Patent: Jun. 27, 2006

(54) WEIGHTED FISHING LEADER DRAG APPARATUS

(76) Inventor: Eric Leone, 310 S. Gurnsey Rd., West Grove, PA (US) 19390

( * ) Notice: Subject to any disclaimer, the term of this patent is extended or adjusted under 35 U.S.C. 154(b) by 0 days.

(21) Appl. No.: 10/874,773

(22) Filed: Jun. 23, 2004

(65) Prior Publication Data

US 2006/0005454 A1   Jan. 12, 2006

(51) Int. Cl.
*A01K 95/00* (2006.01)
*A01K 85/00* (2006.01)
(52) U.S. Cl. .............. 43/42.02; 43/43.1; 43/43.13
(58) Field of Classification Search .................. None
See application file for complete search history.

(56) References Cited

U.S. PATENT DOCUMENTS

| | | | | |
|---|---|---|---|---|
| 167,784 A * | 9/1875 | Pierce | ................. | 43/42.02 |
| 289,224 A * | 11/1883 | Clarke | ................. | 114/311 |
| 363,579 A * | 5/1887 | Best | ................. | 43/44.96 |
| 396,229 A * | 1/1889 | Pagan | ................. | 114/311 |
| 756,527 A * | 4/1904 | Reynolds | ................. | 43/42.02 |
| 800,926 A * | 10/1905 | Mahony | ................. | 43/4 |
| 824,817 A * | 7/1906 | Rhodes | ................. | 43/42.02 |
| 882,344 A * | 3/1908 | Rhodes | ................. | 43/42.02 |
| 923,854 A * | 6/1909 | Kenyon | ................. | 43/42.02 |
| 941,911 A * | 11/1909 | Burthe | ................. | 43/42.02 |
| 1,239,724 A * | 9/1917 | Reimers | ................. | 43/42.02 |
| 1,453,177 A * | 4/1923 | Peterson | ................. | 43/44.96 |
| 1,543,562 A * | 6/1925 | Fleming | ................. | 114/311 |
| 1,782,449 A * | 11/1930 | Siebert | ................. | 43/44.96 |
| 1,810,565 A * | 6/1931 | Kenely | ................. | 43/44.96 |
| 1,857,312 A * | 5/1932 | Kuehn | ................. | 43/42.02 |
| 1,874,102 A * | 8/1932 | Jacobs | ................. | 43/42.02 |
| 2,002,135 A * | 5/1935 | Barton | ................. | 43/42.02 |
| 2,491,564 A * | 12/1949 | Hjalmar | ................. | 114/311 |
| 2,537,321 A * | 1/1951 | Walton | ................. | 43/43.1 |
| 2,546,099 A * | 3/1951 | Jamison et al. | ................. | 135/15.1 |
| 2,598,140 A * | 5/1952 | Shukites | ................. | 43/43.1 |
| 2,768,467 A * | 10/1956 | Radune | ................. | 43/43.1 |
| 2,980,050 A * | 4/1961 | Murray | ................. | 43/44.96 |
| 3,039,419 A * | 6/1962 | Rimar | ................. | 114/311 |
| 3,087,275 A * | 4/1963 | Svoboda | ................. | 43/44.87 |
| 3,187,705 A * | 6/1965 | Costello et al. | ................. | 114/294 |
| 3,396,484 A * | 8/1968 | Clark | ................. | 43/44.96 |
| 3,859,598 A * | 1/1975 | McElwain et al. | ................. | 114/311 |
| 3,911,608 A * | 10/1975 | Holling | ................. | 43/5 |
| 3,943,483 A * | 3/1976 | Strange | ................. | 43/43.13 |
| 4,543,904 A * | 10/1985 | Puoti | ................. | 114/294 |
| 4,562,788 A * | 1/1986 | Abernethy | ................. | 114/311 |
| 4,638,591 A * | 1/1987 | Neumann et al. | ................. | 43/5 |
| 4,653,219 A * | 3/1987 | Kaupert | ................. | 43/43.1 |

(Continued)

FOREIGN PATENT DOCUMENTS

DE          3718019 C1 *   9/1988

(Continued)

*Primary Examiner*—Darren W. Ark
(74) *Attorney, Agent, or Firm*—Connolly Bove Lodge & Hutz

(57) ABSTRACT

A weighted fishing leader drag apparatus is in the form of an elongated hydrodynamically shaped body having a plurality of resilient wings mounted to its outer surface. When the leader drag apparatus is pulled in the opposite direction of the water current, the wings are disposed generally against the outer surface. When the leader drag apparatus is pulled in the same direction as the water current the wings are forced outwardly and create resistance to the water flow to create a drag.

10 Claims, 1 Drawing Sheet

U.S. PATENT DOCUMENTS

| | | | | |
|---|---|---|---|---|
| 4,718,188 A | * | 1/1988 | Roberts | 43/4 |
| 4,727,672 A | * | 3/1988 | Hill et al. | 43/4 |
| RE33,068 E | * | 9/1989 | Abernethy | 114/311 |
| 4,945,850 A | * | 8/1990 | Steinhoff | 114/294 |
| 4,954,110 A | * | 9/1990 | Warnan | 114/244 |
| 4,958,583 A | * | 9/1990 | Renouard | 114/253 |
| 5,233,781 A | * | 8/1993 | Bigelow | 43/4 |
| 5,342,229 A | * | 8/1994 | Whitt | 114/294 |
| 6,092,484 A | * | 7/2000 | Babin et al. | 114/294 |
| 6,119,619 A | * | 9/2000 | Fitzmaurice | 114/294 |
| 6,550,413 B1 | * | 4/2003 | Fiorentino et al. | 114/311 |
| 2005/0198889 A1 | * | 9/2005 | Lubinsky et al. | 43/42.02 |

FOREIGN PATENT DOCUMENTS

| | | | |
|---|---|---|---|
| GB | 2216761 A | * | 10/1989 |
| GB | 2242602 A | * | 10/1991 |
| JP | 10-178990 A | * | 7/1998 |
| JP | 2005-27582 A | * | 2/2005 |

* cited by examiner

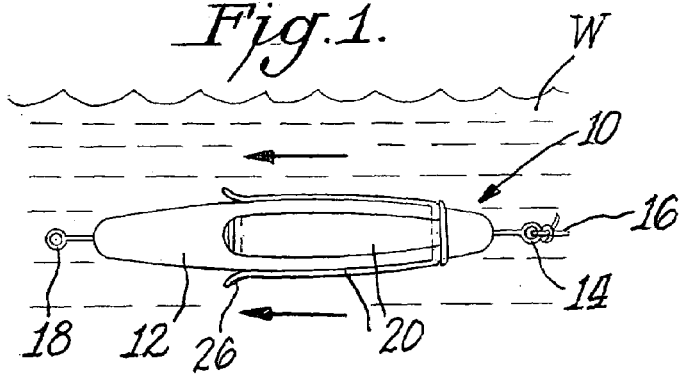
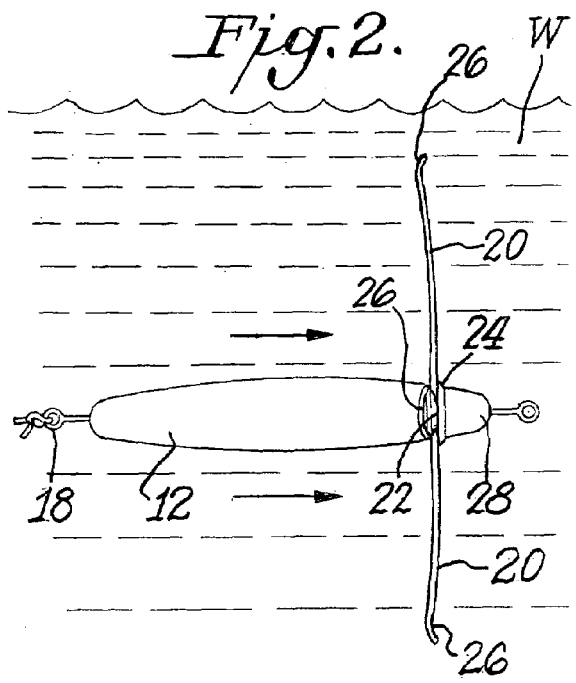
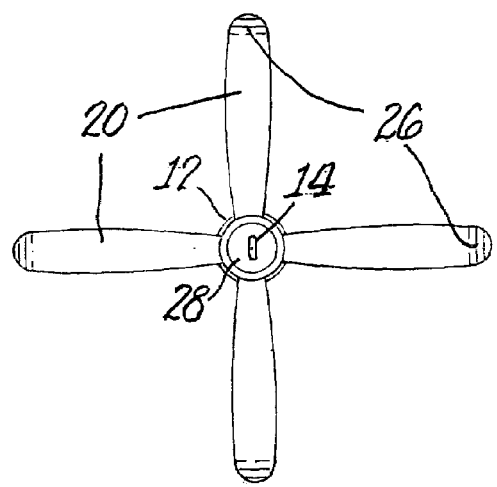

WEIGHTED FISHING LEADER DRAG APPARATUS

BACKGROUND OF THE INVENTION

Various types of equipment are used in fishing, such as weights and fishing leaders which would be attached to the fishing line with the lure attached to the weight or leader and with the lure having the hooks. In drift fishing and in trolling the line is cast into the water and the boat moves with or against the current carrying the line, the leader or weight and the lure with it. Under certain conditions where the current is too swift the weight or leader and lure are moved too quickly making it difficult to attract and catch fish.

SUMMARY OF THE INVENTION

An object of this invention is to provide an improved weighted fishing leader drag apparatus.

A further object of this invention is to provide such a weighted fishing leader drag apparatus which would impart a drag against the current.

In accordance with this invention the weighted fishing leader drag apparatus has an elongated fluid or hydrodynamic shaped body. A plurality of wings are mounted to the outer surface of the body and are movable from a first position disposed generally against the outer surface to minimize drag and to a second position outwardly of and at an angle to the body so as to create a drag against the current.

The wings may be equally spaced spring fingers mounted at one end in a peripheral groove in the body adjacent to a stop collar so that when the current causes the wings to extend outwardly the degree of extension is limited by contact with the stop collar. Preferably, when the wings are fully extended against the stop collar the wings are substantially perpendicular to the longitudinal axis of the body.

THE DRAWINGS

FIG. 1 is a side elevational view of a weighted fishing leader drag apparatus in accordance with this invention showing the wings in the closed non-drag condition;

FIG. 2 is a view similar to FIG. 1 showing the wings extended outwardly to create a drag; and FIG. 3 is a front elevational view of the weighted leader drag apparatus shown in FIG. 2.

DETAILED DESCRIPTION

FIGS. 1–2 illustrate a weighted fishing leader drag apparatus 10 in accordance with this invention. As shown therein weighted leader drag apparatus 10 includes an elongated smoothly curved body 12 which is preferably hydrodynamically shaped wherein the longitudinal cross section is generally of ellipse-type form so as to readily flow through the water. Body 12 is made of known heavy metal of the type conventionally used as fishing weights. Different weights could be used depending on the intended type of fishing. Body 12 includes an attaching member or connector 14 such as an eyelet at one end. A fishing line 16 would be attached to eyelet 14. The opposite end of body 12 also has an attaching member or connector such as an eyelet 18 to which the lure would be attached. Connectors 14 and 18 are located at axially opposite ends of body 12.

In accordance with this invention a plurality of wings 20 are mounted to the outer surface of body 12. Wings 20 would be of a shape to generally conform to the outer surface of body 12 such as by being slightly bowed in both their transverse and longitudinal directions. In the preferred practice of this invention there are a total of four equally spaced wings. The invention, however, could be broadly practiced with as little as one wing and with more than four wings. Having only one wing would not be as effective in achieving the intended function of the wings, but would still have advantages over having no wings. The wings could be of any suitable construction and preferably are spring fingers which are biased to the closed position shown in FIG. 1 disposed generally against the outer surface of body 12.

Where two or more wings are provided it is preferred that each of the wings should have the same shape and size as each other and be equally spaced with respect to each other around body 12 to provide uniform drag or resistance. The invention, however, could be broadly practiced where some wings differ from others in size or shape or in spacing.

The wings could be mounted to body 12 in any suitable manner. For example, the wings could be mounted to a common base which would be attached in a recess 22 in body 12 such as by stretching and snapping the base into the recess. Alternatively, the wings could be individually mounted to the recess. A stop collar 24 is mounted adjacent to the recess 22 outwardly of the mounting end of each wing.

In practice the weighted leader drag apparatus would be cast into the water W as shown in FIG. 1. When the direction of the current is opposite the direction leader drag apparatus 10 is being pulled that is from the eyelet 14 to the eyelet 18 as shown by the arrows in FIG. 1 the leader drag apparatus moves smoothly through the water. FIG. 2, shows the water moving in an opposite direction, where the direction of the current would be against the wings or in the direction from eyelet 18 to eyelet 14. When the current moves in the direction of FIG. 2, the water causes the wings to pivot away from the outer surface of body 12 until the outward movement of wings 20 is halted by stop collar 24. This is the condition shown in FIGS. 2–3. In this condition the wings 20 apply a drag or resistance against the current to slow the movement of the weighted leader drag apparatus 10 and consequently slow the movement of the lure attached to weighted leader drag apparatus 10.

As illustrated, the body 12 may be considered as having a main body portion and a tip portion. The main body portion has a generally elliptical cross section with a smooth curved outer surface which terminates in a first end where elelet 18 is attatched and a remot second end which extends to recess 22. The first end is illustrated as having a smooth outer surface. The tip portion, which is outwardly of recess 22, is illlustrated as being of frusto-elliptical shape having a wide end at recess 22 adjacent to the second end of the main body portion. The peripheral recess 22 is thereby at the junction of the tip portion wide end and o fthe main body portion second end. The wide end of the tip portion is illustrated as being of larger dimension and extending radially outwardly beyond main body portion second end as clearly shown in FIG. 2. The stop collor 24 is located at the wide end of the tip portion. As discussed, and illustrated, each of the wings 20 is pivotally mounted at one end of each wing at the recess 22. As also previously described the stop collar 24 limits the pivotal movement of the wings when the wings are in the position shown in FIGS. 2 and 3.

The wings 20 could be shaped to simply fit snugly against the body 12 throughout the length of the wings. If desired, however, structure may be incorporated to facilitate the water from the current flowing between each wing and the outer surface of body 12 so as to create the force necessary for spreading the wings to their open condition. In order to assist the water flowing between the wings and the outer surface of the body 12, each wing may terminate in an outward bend 26. Alternatively, slight grooves may be formed in the outer surface of body 12 at the location of each wing so that the water can flow into these longitudinal grooves and then create the outward force for moving the wings to their maximum drag creating condition shown in FIG. 2.

Preferably, body 12 is formed of a single member with the wings 20 mounted in the recess 22. If desired, however, body 12 may be of two-piece construction which includes a cap portion 28 terminating in the stop collar 24. Cap portion 28 would be mounted to the main portion of body 12 in any suitable manner after the wings have been assembled in the recess 22. When cap 28 is mounted to the remainder of body 12 the cap 28 and the remainder of body 12 form a unitary body member.

Other variations of this invention will be apparent to those of ordinary skill in the art given the teachings and guidelines herein.

What is claimed is:

1. A weighted fishing leader drag apparatus comprising an elongated hydrodynamic shaped body having an outer surface, a plurality of wings mounted to said body at said outer surface, said wings being movable to and from a first position disposed generally against said outer surface to minimize any drag being caused by said wings and a second position outwardly of and at an angle to said outer surface to create a drag, said body comprising a main body portion and a tip portion, said main body portion having a generally elliptical cross section which extends along a longitudinal axis of said body and defines a art of said outer surface with a smooth curved shape terminating in a first end and a remote second end, said first end defining another part of said outer surface with a smooth shape, said tip portion being of frusto-elliptical shape with a wide end adjacent to said second end of said main body portion, a peripheral recess at the junction of said tip portion wide end and said main body portion second end, said wide end of said tip portion both being of larger dimension than and extending radially outwardly beyond said main body portion second end, a stop collar at said wide end of said tip portion, each of said wings being pivotally mounted at one end of each said wing at said recess, each of said wings has a free end opposite the one end which is bent outwardly to facilitate water flowing between each of said wings and said outer surface of said body, each of said free ends extends outwardly away from said main body portion at an angle relative to the longitudinal axis of said body while a remaining majority portion of each of said wings is disposed generally against said outer surface when the wings are in the first position, said stop collar limiting the pivotal movement of said wings at said second position, a first connector mounted to said tip portion for connection to a fishing line, and a second connector mounted to said first end of said main body portion for connection to a lure.

2. The leader drag apparatus of claim 1 wherein said plurality of wings comprises a plurality of spring fingers each of which is biased to said first position.

3. The leader drag apparatus of claim 2 wherein said wings are equally spaced from each other around said body.

4. The leader drag apparatus of claim 3 wherein said plurality of wings comprises more than two wings.

5. The leader drag apparatus of claim 4 wherein said plurality of wings comprises four wings.

6. The leader drag apparatus of claim 5 wherein said wings are of elongated form generally conforming to said outer surface.

7. The leader drag apparatus of claim 6 wherein said wings are disposed generally perpendicular to the longitudinal axis of said body when said wings are in said second position.

8. The leader drag apparatus of claim 1 wherein said wings are of elongated form generally conforming to said outer surface.

9. The leader drag apparatus of claim 1 including a fishing line secured to said first connector, and a fishing lure being secured to said second connector.

10. The leader drag apparatus of claim 1 wherein said stop collar extends radially outwardly of and beyond said wide end of said tip portion.

\* \* \* \* \*

UNITED STATES PATENT AND TRADEMARK OFFICE
CERTIFICATE OF CORRECTION

| | | |
|---|---|---|
| PATENT NO. | : 7,065,918 B2 | Page 1 of 1 |
| APPLICATION NO. | : 10/874773 | |
| DATED | : June 27, 2006 | |
| INVENTOR(S) | : Ernest Leone | |

It is certified that error appears in the above-identified patent and that said Letters Patent is hereby corrected as shown below:

On the Title Page Item (76) "Eric Leone" should be "Ernest Leone".

Signed and Sealed this

Thirtieth Day of June, 2009

JOHN DOLL
*Acting Director of the United States Patent and Trademark Office*